(12) United States Patent
Matasek et al.

(10) Patent No.: US 6,715,928 B1
(45) Date of Patent: Apr. 6, 2004

(54) CONNECTOR PANEL MOUNT SYSTEM

(75) Inventors: Jeffrey A. Matasek, Woodridge, IL (US); Igor Grois, Northbrook, IL (US); Thomas R. Marrapode, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/376,171

(22) Filed: Feb. 27, 2003

(51) Int. Cl.[7] .................................................. G02B 6/40
(52) U.S. Cl. ......................................................... 385/56
(58) Field of Search .............................. 385/56, 53, 55, 385/76, 78, 60, 134, 147

(56) References Cited

U.S. PATENT DOCUMENTS

| 4,834,486 A | 5/1989 | Walker | 350/96.2 |
|---|---|---|---|
| 6,164,834 A | 12/2000 | Lee | 385/56 |
| 6,186,670 B1 | 2/2001 | Austin et al. | 385/55 |
| 6,354,746 B1 * | 3/2002 | Lee | 385/77 |
| 6,425,694 B1 * | 7/2002 | Szilagyi et al. | 385/76 |
| 6,464,406 B1 | 10/2002 | Yarita et al. | 385/60 |
| 6,554,482 B1 * | 4/2003 | Matasek et al. | 385/55 |
| 6,572,272 B2 * | 6/2003 | Ngo | 385/53 |
| 6,607,303 B2 * | 8/2003 | Ngo et al. | 385/53 |

* cited by examiner

*Primary Examiner*—Tulsidas Patel
(74) *Attorney, Agent, or Firm*—Romi N. Bose

(57) ABSTRACT

An adapter assembly is provided for mounting in an opening in a panel. The assembly includes a housing mountable in the opening and including a pair of housing halves. A first housing half projects from one side of the panel and has a first receptacle for receiving a connector. The first housing half is fabricated of plastic material to withstand repeated insertions of the connector into the receptacle. A second housing half projects from an opposite side of the panel and has a second receptacle for receiving a complementary connecting device for mating with the connector within the adapter assembly. The second housing half is fabricated of metal material to provide EMI protection at the opening in the panel.

26 Claims, 3 Drawing Sheets

CONNECTOR PANEL MOUNT SYSTEM

FIELD OF THE INVENTION

This invention generally relates to the art of fiber optic connectors, electrical connectors and other such connecting devices and, particularly, to a system for mounting connectors in an opening in a panel, circuit box, circuit board or other substrate.

BACKGROUND OF THE INVENTION

Fiber optic connectors, electrical connectors, adapters for such connectors and variety of other such connecting devices often are mounted within openings in a panel. The connecting interface of the connector, therefore, passes through the panel, i.e., from one side of the panel to the other. The panel may be a drawer panel, a box panel, a backplane panel, a circuit board or a variety of other planar substrates.

In addition, a pair of connectors or a connector and another transmission device often are mated in an adapter which centers the connectors. The adapter couples the connectors together in an in-line arrangement. The adapter may be designed for mounting in the opening in the panel, circuit board or other substrate, whereby one connector is inserted into the adapter from one side of the panel and another connector or other transmission device is inserted into the adapter from the opposite side of the panel.

Problems are encountered in mounting connecting devices through openings in panels where electromagnetic interference (EMI) is present. For instance, in a drawer panel, a box panel, a backplane panel or the like, all kinds of electrical circuitry may be disposed behind the panel (i.e., the opposite side of the panel) and it is desirable to prevent the electromagnetic interference from migrating through the connectors interface in the panel opening to the front side of the panel. If an adapter in an opening in a panel is fabricated of plastic material which has excellent wear characteristics, such as for allowing repeated mating and unmating of the connectors which typically are made of plastic materials, electromagnetic interference has a tendency of migrating directly through the plastic adapter. In order to provide EMI protection under such circumstances, it might be proposed to fabricate the adapter out of metal material, such as a diecast metal material. Unfortunately, such a metal adapter creates additional problems of creating plastic "dust" as a result of repeated mating and unmating cycles of a plastic connector with a metal adapter. It also might be proposed to plate a plastic adapter with metal material, but such metallization is expensive and the plating has a tendency to "flake-off" during repeated mating and unmating cycles, again creating undesirable plastic and metal dust. The present invention is directed to solving these problems by providing an adapter assembly or other receptacle which has a plastic part for receiving a repeatedly mateable connector, along with a metal part to provide EMI protection at the opening in the panel.

SUMMARY OF THE INVENTION

An object, therefore, of the invention is to provide a new and improved receptacle or adapter assembly for mounting in an opening in a panel.

In the exemplary embodiment of the invention, the receptacle or adapter assembly includes a housing mountable in the opening in the panel and including a pair of housing halves secured together at an interface. A first of the housing halves projects from one side of the panel and has a first receptacle for receiving at least one connector. The first housing half is fabricated of plastic material to withstand repeated insertions of the connector with a plastic housing into the receptacle. A second housing half projects from an opposite side of the panel and has a second receptacle for receiving a complementary connecting device for mating with the connector within the adapter assembly. The second housing half is fabricated of metal material to provide EMI protection at the opening in the panel.

As disclosed herein, the first housing half is unitarily molded of dielectric plastic material. The second housing half is fabricated of diecast metal material.

Other features of the invention include a snap-latch means between the pair of housing halves for securing the housing halves together. A latch also is provided on at least one of the housing halves for securing the adapter assembly in the opening in the panel. As disclosed herein, the latch is a metal latch and is a singular component having a pair of latch arms on opposite sides of the adapter assembly. At least one alignment sleeve spans the interface between the pair of housing halves, with opposite ends of the sleeve extending into a pair of aligned holes in the respective housing halves.

One additional feature of the invention includes use of different color plastic for molding the plastic half of the adapter to indicate the type of connector, e.g., single mode, APC etc., type of connector installed in the metal half of the adapter.

The invention also contemplates additional EMI protection by providing an EMI gasket about the adapter assembly and substantially surrounding the opening in the panel. As disclosed herein, the EMI gasket may be fabricated of metal material or foam with metal conductive fabric over it, or silicone with metal particles impregnated into it and is disposed about the second, metal half of the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
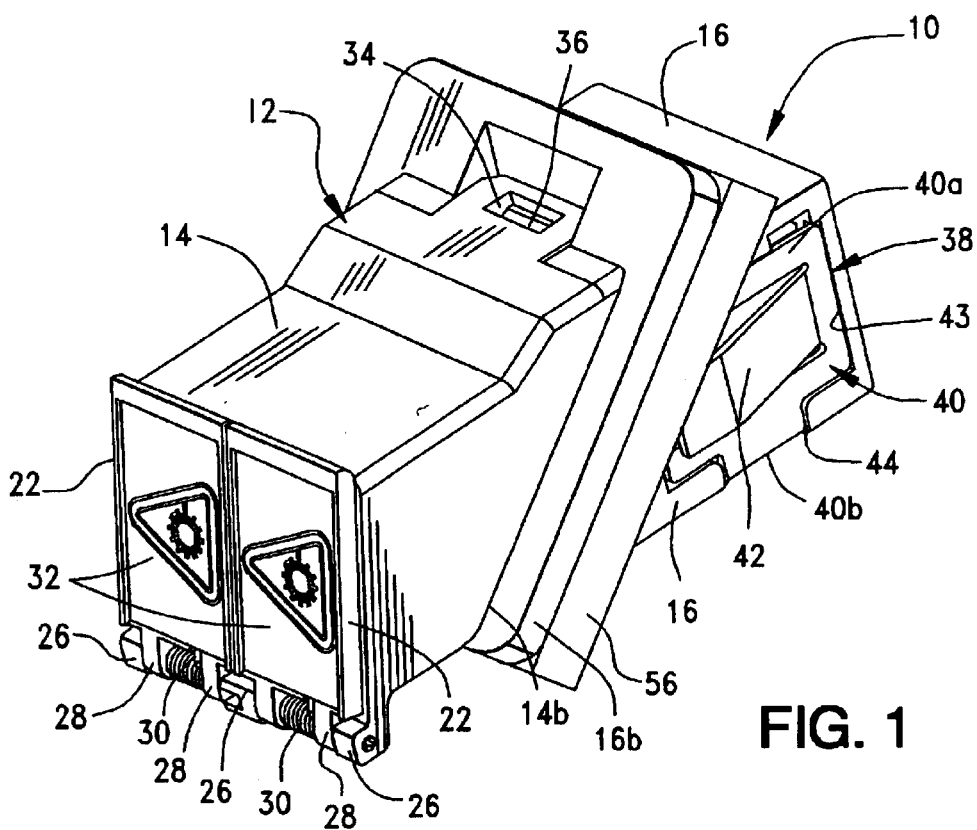
FIG. 1 is a front perspective view of a receptacle or adapter assembly embodying the concepts of the invention.

Referring to the drawings in greater detail, and first to FIGS. 1 and 2, the invention is illustrated in an adapter assembly, generally designated 10, for mounting in an opening in a panel shown in FIG. 3 and described hereinafter. The adapter assembly includes a housing, generally designated 12, which is mountable in the opening in the panel and which includes a pair of housing halves 14 and 16 which are connected together at an interface defined by an abutting interior wall 14a (FIG. 2) of housing half 14 and an interior wall 16a of housing half 16. A pair of alignment pins 18 (FIG. 2) project from interior wall 16a of housing half 16 into a pair of alignment holes (not visible in the drawings) in interior wall 14a of housing half 14.

At this point, it should be understood that, although adapter assembly 10 disclosed herein is a receptacle or adapter assembly for fiber optic connectors, the invention is equally applicable for a wide variety of "connector" applications wherein connectors or other transmission devices are mountable within or through panels. The concepts of the invention are equally applicable for electrical connectors or other such connecting devices, as well as fiber optic connectors, where EMI protection (as described in the "Background", above) is desirable or necessary.

In addition, while the two housing parts 14 and 16 are called housing "halves" herein, this term is used for simplicity purposes to provide a clear and concise understanding of the invention. Obviously, each housing half does not necessarily mean that each of the housing halves comprises "one-half" or 50% of the overall housing structure.

With those understandings, housing half 14 can be considered a front or first housing half in that it is located at the front of a panel, as described hereinafter. Front housing half 14 includes first receptacle means in the form of a pair of receptacles 20 (FIG. 2) for receiving a pair of fiber optic connectors. The receptacles normally are closed by a pair of shutter plates or doors 22 pivotally mounted to the bottom front edge of housing half 14 by a pivot pin 24 inserted through three journals 26 integral with the housing half and through two journals 28 at the bottom edge of each shutter plate. The shutter plates are biased to a closed position shown in FIG. 1 by a pair of torsion springs 30 wrapped about pivot pin 24. A pair of environmental labels 32 may be adhered to the outside face of shutter plates 22. The shutter plates are provided for preventing dust or dirt from entering receptacles 20 as well as for providing protection (such as for an operator's eyes) from radiation, such as laser beams, which might emanate out of the fiber optic connectors at the back side of the panel. Front housing half 14 has a pair of angled abutment surfaces 14b on opposite sides thereof. Finally, front housing half 14 has a top latch opening 34 and a pair of bottom latch openings (not visible in the drawings) for latching the two housing halves together, as will be described hereinafter.

Housing half 16 can be considered the second or rear housing half herein. The rear housing half has an outwardly projecting peripheral flange 16b which is angled and which abuts against angled abutment surfaces 14b of front housing half 14 when the housing halves are latched together as seen in FIG. 1. Rear housing half 16 includes a top chamfered latch boss 36 for snapping into top latch opening 34 of the front housing half to latch the housing halves together. In addition, a pair of bottom chamfered latch bosses 38 (only one being visible in the drawings) snap into the bottom latch openings of the front housing half when the two housing halves are latched together as seen in FIG. 1. Of course it is understood that other types of snap-latch structural arrangements may be used as well as, a press-fit between alignment pins 18 and alignment holes (not shown) or just by gluing together or welding with ultrasound to hold together the two housing halves.

Still referring to FIGS. 1 and 2, latch means, generally designated 38 in FIG. 1, is provided on rear housing half 16 for securing adapter assembly 10 in the opening in the panel, as will be described hereinafter. Specifically, the latch means includes a singular latch component, generally designated 40, which is stamped and formed of sheet metal material. Rear housing half 16 has a pair of shallow recesses 43 on opposite sides thereof and a shallow recess 44 in the bottom thereof. Metal latch 15 is generally U-shaped to define a pair of legs 40a joined by a cross brace 40b. A pair of flexible latch arms 42 are formed out of legs 40a and are bent outwardly therefrom. When metal latch 40 is mounted on rear housing half 16 as shown in FIG. 1, legs 40a snap into recesses 43 in the sides of the housing half while cross brace 40b is disposed in recess 44 in the bottom of the rear housing half. It can be seen in FIG. 1 how latch arms 42 project outwardly from the sides of the rear housing half.

Figure 3:
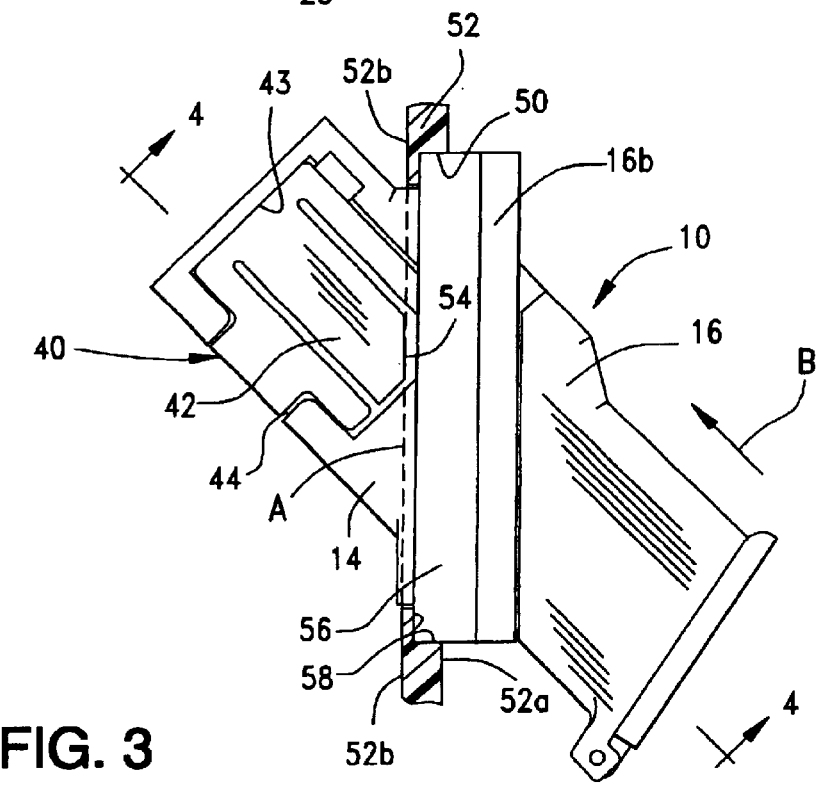
FIG. 3 is a side elevational view of the adapter assembly mounted in an opening in a panel.

FIG. 3 shows adapter assembly 10 mounted in an opening 50 in a panel 52. The panel has a front side 52a and a rear side 52b. Dotted line "A" represents the rear side of the panel at opposite sides of opening 50 which engages angled edges 54 of latch arms 42 which project outwardly from the adapter assembly. When the adapter assembly is inserted through opening 50 in panel 52 from front side 52a of the panel in the direction of arrow "B", flexible latch arms 42 are biased inwardly until angled edges 54 clear rear side 52b of the panel, whereupon the flexible latch arms snap back outwardly to secure the adapter assembly in the opening in the panel.

Figure 2:
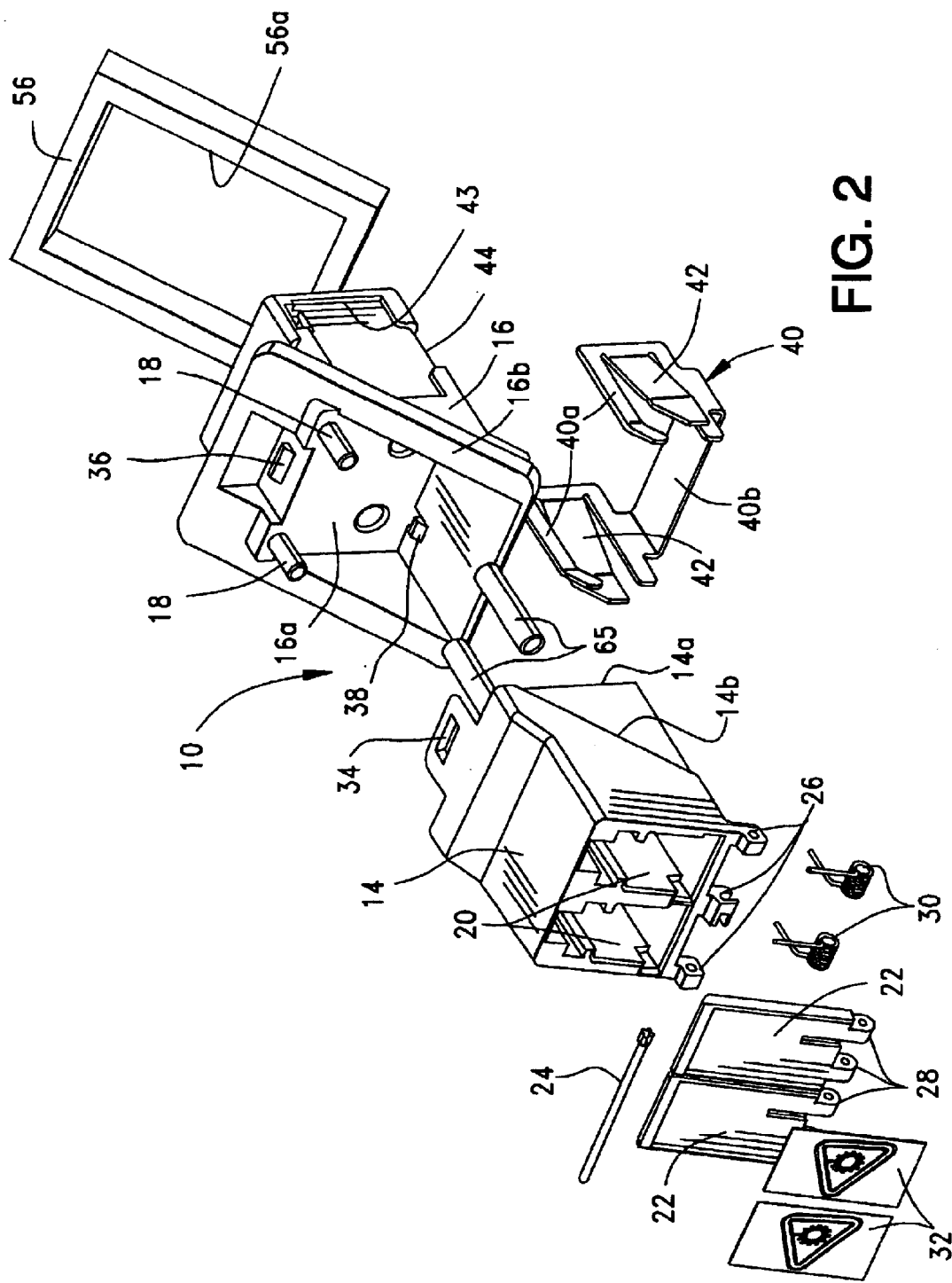
FIG. 2 is an exploded perspective view of the adapter assembly.

All of FIGS. 1–3 show a feature of the invention in providing a generally rectangular EMI gasket 56 which has an opening 56a (FIG. 2) conforming to the peripheral dimensions of rear housing half 16. The EMI gasket is positioned over the rear housing half and up against the rear face of angled flange 16b as seen in FIGS. 1 and 3. The EMI gasket substantially surrounds opening 50 in panel 52 as seen in FIG. 3, in order to prevent electromagnetic interference from leaking through the opening around the outside of the adapter assembly and also to ground the adapter to the panel. In fact, opening 50 can be cut-out or "stepped", as at 58 in FIG. 3, in order to tightly receive the EMI gasket about the opening in the panel.

According to the concepts of the invention, front housing half 14 is fabricated of plastic material in order to withstand repeated insertions of connectors into receptacles 20. In other words, the plastic material has wear characteristics which allows for repeated mating and unmating cycles of the connectors minimizing the plastic material flaking from the connector or the adaptor, or otherwise creating undesirable dust. The entire front housing half can be unitarily molded of dielectric plastic material or contain a plastic insert in metal.

With the front housing half fabricated of plastic material to withstand repeated interconnections, the invention contemplates that rear housing half 16 be fabricated of a metal material to provide EMI protection at opening 50 in panel 52. The rear housing half can be unitarily fabricated of diecast metal material. In a typical application of panel-mounted connectors, it is quite common that a receptacle assembly, such as adapter assembly 10, be used in applications where the rear side of the panel is enclosed and the connectors or other connecting devices inserted into rear housing half 16 are not repeatedly mated. Therefore, the problems of flaking or plastic dust actually is not an issue with the rear of the adapter assembly behind the panel where an operator rarely is required to mate connecting devices with the adapter assembly. Therefore, repeated mating and unmating cycles occur at the front of the panel where plastic housing half 14 is used.

Figure 4:
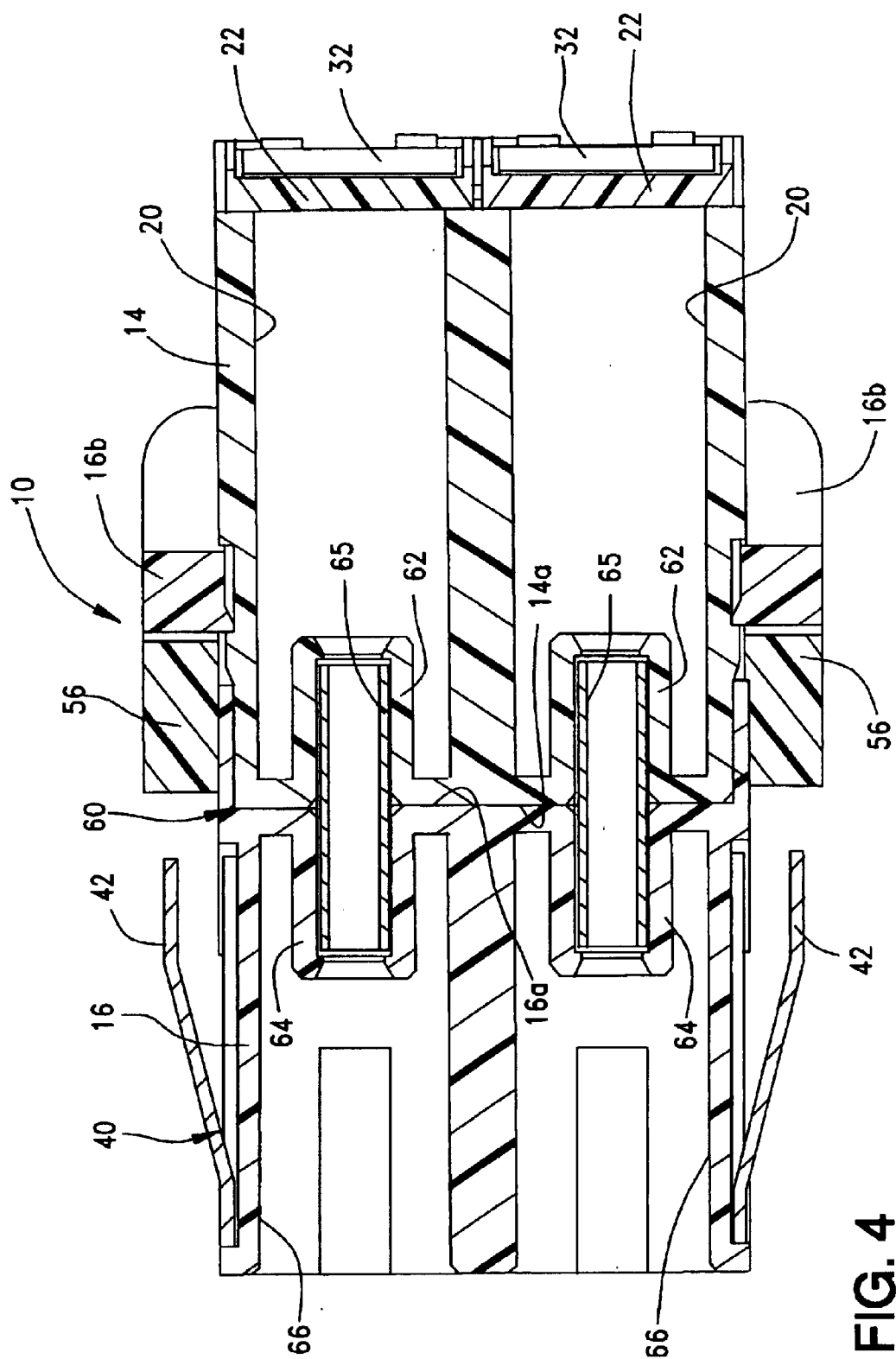
FIG. 4 is a section taken generally along line 4—4 of FIG. 3.

Finally, FIG. 4 is a section through the adapter assembly, generally along line 4—4 of FIG. 3. This depiction shows an interface, generally designated 60, between front housing half 14 and rear housing half 16 where interior walls 14a and 16a of the respective housing halves abut. These interior walls are provided with sockets 62 in the front housing half and sockets 64 in the rear housing half for receiving a pair of alignment sleeves 65 which are also shown in FIG. 2. FIG. 4 also shows that rear housing half 16 includes second receptacle means in the form of a pair of receptacles 66 generally aligned with receptacles 20 of the front housing half. With adapter assembly 10 being designed for fiber optic applications, a pair of fiber optic connectors or other optical fiber transmission devices (not shown) are inserted into receptacles 66. The connectors inserted into receptacles 20 and the connectors inserted into receptacles 66 have projecting ferrules which are aligned in alignment sleeves 65.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An adapter assembly for mounting in an opening in a panel, comprising:
   a housing mountable in the opening in the panel and including a pair of housing halves secured together at an interface;
   a first of the housing halves projecting from one side of the panel and having first receptacle means for receiving at least one connector, the first housing half being fabricated of plastic material to withstand repeated insertions of the connector into the receptacle means; and
   a second of the housing halves projecting from an opposite side of the panel and having second receptacle means for receiving a complementary connecting device for mating with the connector within the adapter assembly, the second housing half being fabricated of metal material to provide EMI protection at the opening in the panel.

2. The adapter assembly of claim 1 wherein said first housing half is unitarily molded of dielectric plastic material.

3. The adapter assembly of claim 1 wherein said second housing half is fabricated of diecast metal material.

4. The adapter assembly of claim 3 wherein said first housing half is unitarily molded of dielectric plastic material.

5. The adapter assembly of claim 1, including snap-latch means between the pair of housing halves for securing the housing halves together.

6. The adapter assembly of claim 1, including at least one alignment sleeve spanning said interface between the pair of housing halves, with opposite ends of the sleeve extending into a pair of aligned holes in the respective housing halves.

7. The adapter assembly of claim 1, including latch means on at least one of the housing halves for securing the adapter assembly in the opening in the panel.

8. The adapter assembly of claim 7 wherein said latch means comprises a metal latch.

9. The adapter assembly of claim 8 wherein said metal latch comprises a singular component having a pair of latch arms on opposite sides of the adapter assembly.

10. The adapter assembly of claim 1, including an EMI gasket about the adapter assembly and substantially surrounding the opening in the panel.

11. The adapter assembly of claim 10 wherein said EMI gasket is fabricated of metal material and is disposed about the second, metal half of the housing.

12. The adapter assembly of claim 10 wherein said EMI gasket is fabricated of foam material with metal conductive fabric covering said foam material.

13. The adapter assembly of claim 10 wherein said EMI gasket is fabricated from silicone with material impregnated with metallic particles.

14. The adapter assembly of claim 2, wherein said dielectric plastic material is of a predetermined color to indicate the type of mating connector installed in the second of the housing halves.

15. An adapter assembly for mounting in an opening in a panel, comprising:
   a housing mountable in the opening in the panel and including a pair of housing halves secured together at an interface;
   a first of the housing halves projecting from one side of the panel and having first receptacle means for receiving at least one connector, the first housing half being unitarily molded of dielectric plastic material to withstand repeated insertions of the connector into the receptacle means;
   a second of the housing halves projecting from an opposite side of the panel and having second receptacle means for receiving a complementary connecting device for mating with the connector within the adapter assembly, the second housing half being fabricated of diecast metal material to provide EMI protection at the opening in the panel; and
   latch means between the pair of housing halves for securing the housing halves together.

16. The adapter assembly of claim 15, including at least one alignment sleeve spanning said interface between the pair of housing halves, with opposite ends of the sleeve extending into a pair of aligned holes in the respective housing halves.

17. The adapter assembly of claim 15, including an EMI gasket about the adapter assembly and substantially surrounding the opening in the panel.

18. The adapter assembly of claim 17 wherein said EMI gasket is fabricated of metal material and is disposed about the second, metal half of the housing.

19. The adapter assembly of claim 15, including a latch on at least one of the housing halves for securing the adapter assembly in the opening in the panel.

20. The adapter assembly of claim 19 wherein said latch comprises a metal latch.

21. The adapter assembly of claim 20 wherein said metal latch comprises a singular component having a pair of latch arms on opposite sides of the adapter assembly.

22. An adapter assembly for mounting in an opening in a panel, comprising:
   a housing mountable in the opening in the panel and including a pair of housing halves secured together at an interface;
   a first of the housing halves projecting from one side of the panel and having first receptacle means for receiving at least one connector, the first housing half being fabricated of plastic material to withstand repeated insertions of the connector into the receptacle means;
   a second of the housing halves projecting from an opposite side of the panel and having second receptacle means for receiving a complementary connecting device for mating with the connector within the adapter assembly, the second housing half being fabricated of metal material to provide EMI protection at the opening in the panel;

first latch means between the pair of housing halves for securing the housing halves together;

second latch means on at least one of the housing halves for securing the adapter assembly in the opening in the panel; and an EMI gasket about the adapter assembly and substantially surrounding the opening in the panel.

23. The adapter assembly of claim 22 wherein said second latch means comprises a metal latch.

24. The adapter assembly of claim 23 wherein said metal latch comprises a singular component having a pair of latch arms on opposite sides of the adapter assembly.

25. The adapter assembly of claim 22 wherein said EMI gasket is fabricated of metal material and is disposed about the second, metal half of the housing.

26. The adapter assembly of claim 22, including at least one alignment sleeve spanning said interface between the pair of housing halves, with opposite ends of the sleeve extending into a pair of aligned holes in the respective housing halves.

* * * * *